United States Patent
Lieb et al.

(10) Patent No.: US 6,408,788 B1
(45) Date of Patent: Jun. 25, 2002

(54) BI-MODAL SEED PORT FOR BIRD FEEDER

(75) Inventors: Robert Paul Lieb; James Roberts Obenshain, both of Peebles, OH (US)

(73) Assignee: Cedar Works, LLC, Peebles, OH (US)

( * ) Notice: Subject to any disclaimer, the term of this patent is extended or adjusted under 35 U.S.C. 154(b) by 0 days.

(21) Appl. No.: 09/826,775

(22) Filed: Apr. 6, 2001

(51) Int. Cl.[7] .............................................. A01K 61/02
(52) U.S. Cl. ..................... 119/52.2; 119/57.8; D30/124
(58) Field of Search ............................. 119/52.1, 52.2, 119/52.4, 53, 57.8, 61; D30/124, 127

(56) References Cited

U.S. PATENT DOCUMENTS

| | | | |
|---|---|---|---|
| D274,013 S | * 5/1984 | Sun | 119/57.8 |
| 4,712,512 A | * 12/1987 | Schrieb et al. | 119/52.2 |
| 5,033,411 A | * 7/1991 | Brucker | 119/52.2 |
| 6,062,167 A | * 5/2000 | Soley | 119/57.8 |
| D451,251 S | * 11/2001 | Chrisco et al. | D30/124 |

* cited by examiner

*Primary Examiner*—Charles T. Jordan
*Assistant Examiner*—Elizabeth Shaw
(74) *Attorney, Agent, or Firm*—Neal O. Willmann

(57) ABSTRACT

A seed port, intended to permit dispensing large and small seeds from the same feeder, can be used with a bird feeder having a columnar reservoir for the containment of bird seed wherein the seed port has a platform with an opening that attaches to the reservoir in alignment with an opening in the reservoir. The seed port further provides a trough and a hinged lid with a small opening that will alternatively deny access to the trough while permitting access to seeds in the reservoir; or deny access to seeds in the reservoir while permitting access to seeds in the trough.

5 Claims, 2 Drawing Sheets

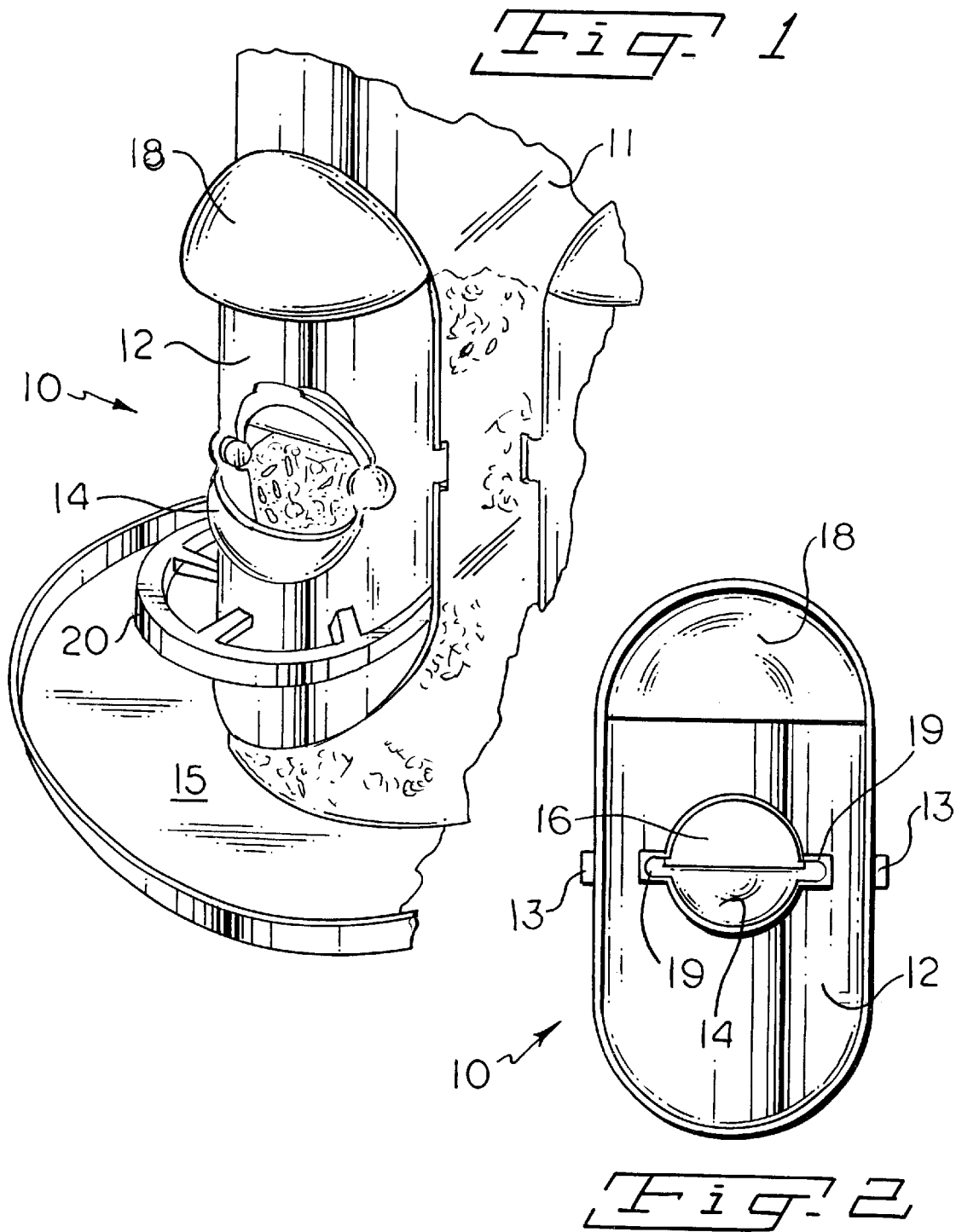

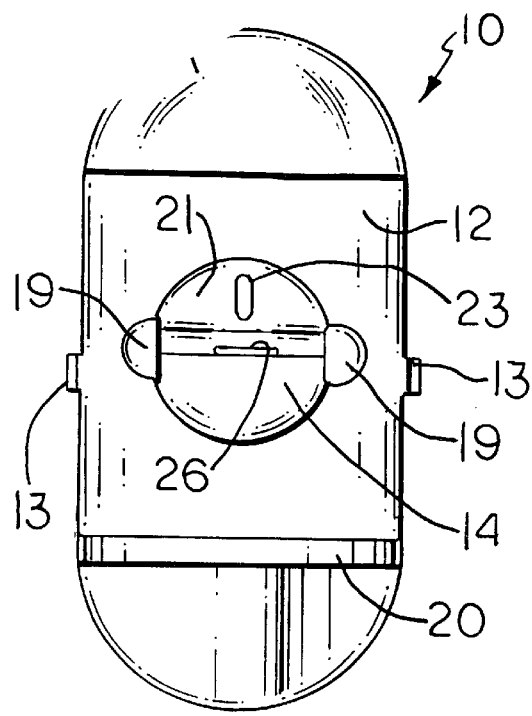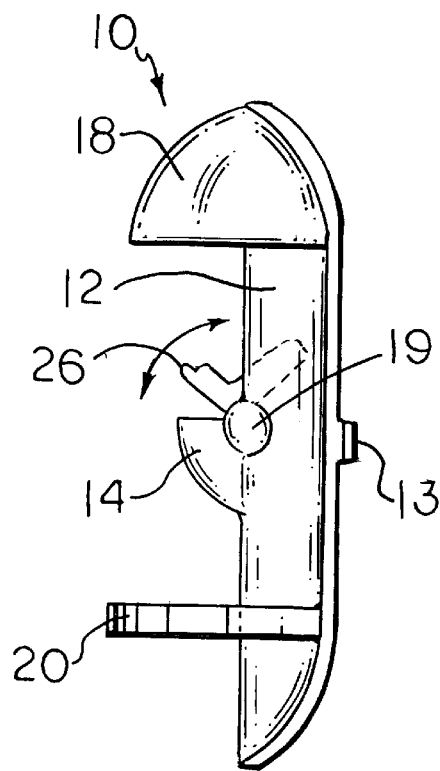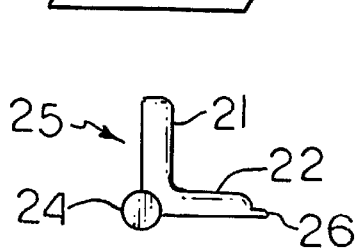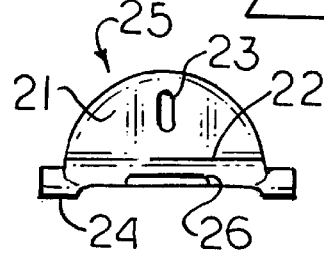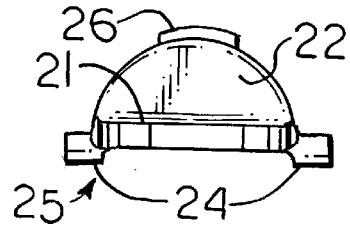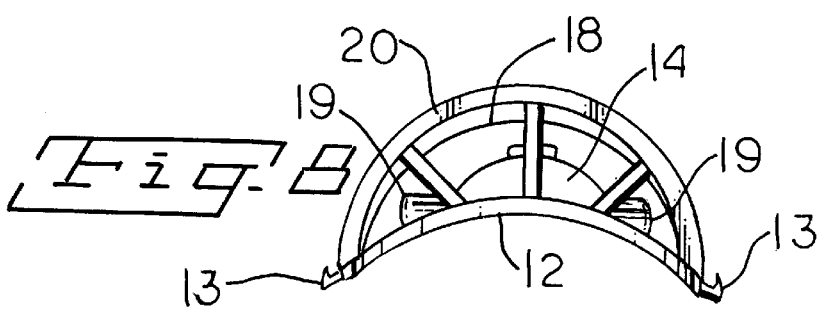

BI-MODAL SEED PORT FOR BIRD FEEDER

BACKGROUND OF THE INVENTION

This disclosure relates to bird feeders, and more specifically, to a bird feeder featuring a particularly defined seed port that will introduce versatility with regard to the types of seed that can be dispensed from a bird feeder equipped with a seed port having the features described herein. In a preferred embodiment, the disclosed seed port will have two modes: In one mode the port will dispense large seeds from the feeder; in another mode, the port will allow the feeder to dispense relatively small seeds.

DESCRIPTION OF THE PRIOR ART

Seed ports attached to or integrated with bird feeders to control the flow or size of seed to be dispensed from the housing or storage reservoir of the feeder have been described in earlier patent documents. Representative of those patents and the various ports described therein are the following:

U.S. Pat. No. 4,414,922, which issued Nov. 15, 1983 to Hyde, describes an improved feeding port having an opening in the side of the storage compartment that is partially occluded by resilient finger members arranged to prevent the free flow of seeds yet permit easy access and forcible extraction by feeding birds.

U.S. Pat. No. 4,977,859, which issued Dec. 18, 1990 to Kilham, describes a bird feeding device wherein the ports for dispensing bird seed can be maintained or diminished to vary the flow of seed to feeding birds.

U.S. Pat. No. 4,188,913, which issued Feb. 19, 1980 to Earl et al. describes a wild bird feeding device with separate compartments with dispensing units that can be variously aligned with holes or ports in the wall of the device to vary the flow of seed from the seed compartments to the dispensing unit.

These disclosures, and other, similar patents, too numerous to mention, offer suggestions and approaches for addressing the problems inherent in attempting to regulate the flow of bird seed from a reservoir to the feeding birds and/or to provide ports of the appropriate size for the seed being dispensed. However, notwithstanding the myriad and clever approaches previously disclosed for facilitating a controlled or metered dispensation of birdseed from a reservoir, nothing commercially available, or even gratuitously disclosed, suggests the novel and effective means described herein.

SUMMARY OF THE INVENTION

Essentially, what is described herein is a seed port for a bird feeder, said seed port allowing the feeder to dispense seeds of different sizes. Typically, the feeder will have a columnar, walled reservoir for containment or storage of seeds; and, of course, it will have at least one opening, generally in the side of the column, to provide access to the contained seeds. This opening would be in addition, of course, to an opening, usually in the top of the reservoir, for replenishing the feeder with seeds. The disclosed seed port will be attached to the side of the seed reservoir, in alignment with the dispensing hole. Specifically, the seed port will be comprised of the following: a vertical platform having an opening in alignment with an opening in the wall of the reservoir;

a trough, typically on the anterior surface of said platform, for collecting seeds flowing naturally from the reservoir, through the aligned openings; and a hinged lid attached to the trough and positioned to pivot thus providing alternative access to seeds in the trough or to seeds in the reservoir.

BRIEF DESCRIPTION OF THE DRAWING

FIG. 1 is an elevated perspective view, in partial section, of a bird feeder equipped with the disclosed bi-modal seed port.

FIG. 2 is an elevated rear view of the disclosed port with the bi-modal hinged lid removed.

FIG. 3 is an elevated front view of the disclosed port in a mode for dispensing smaller seeds.

FIG. 4 is an elevated side view of the disclosed port showing the hinged seed selector of the bi-modal port in transition between the two modes.

FIG. 5 is a side view of the hinged seed selector removed from the port.

FIG. 6 is a front view of the hinged seed selector, in the small seed mode, removed from the port.

FIG. 7 is a front view of the hinged seed selector, in the large seed mode, removed from the port.

FIG. 8 is a bottom plan view of the disclosed seed port.

DESCRIPTION OF THE PREFERRED EMBODIMENT

The disclosed seed port can best be described by referring to the drawing. The perspective view of FIG. 1 illustrates how the seed port 10 attaches to the seed reservoir 11. Typically, the seed port can be made secure in its attachment to the reservoir with the use of tabs 13 clearly depicted initially in FIG. 2.

The seed reservoir 11 is typically constructed from a clear plastic material and can be either hung from an overhead structure or supported by a pole or pedestal. Frequently, but not necessarily, the reservoir will rest on a base plate 15 to catch and collect seed spilled or dropped from the seed port 10 in the normal course of events.

The seed port 10 is depicted apart from the reservoir in FIGS. 2, 3 and 4. FIG. 3, an elevated frontal view, illustrates all of the essential and preferred elements of the port 10. Structurally, the port originates with a platform 12 which is preferably, but not necessarily, curved or arched to conform with the shape of the wall of the reservoir 11. In addition to the aforementioned tabs 13 or clips for attachment to the reservoir, the platform has an opening 16, centrally located, for alignment with a corresponding hole or opening in the reservoir (not shown). Seed will flow, as a result of gravity, from the reservoir, through the aligned openings. Once the seed passes through the aligned openings, it flows into a reservoir 14 on the anterior surface of the platform. Without more structure limiting access to the trough, birds would be able to feed freely from the reservoir by simply alighting on the perch 20 and availing themselves of the seed flowing naturally from the reservoir 11, through the opening 16 in the platform 12 of the seed port 10 and into the trough 14.

However, it is an objective of the bi-modal seed port to accommodate at least two dramatically different sizes of bird seed, and thus provide two different ports of access for feeding birds, depending on what type of bird is being summoned for feeding, which, in turn, determines what type of seed is being offered.

As indicated, the seed port 10 with its opening 16 aligned with an opening in the reservoir 11 will dispense all manner of seed from the trough 14. But if smaller seeds, such as thistle seeds, etc., are to be dispensed it is preferable that they be offered through a much smaller opening than the one afforded by the trough 14.

So, in order to equip the reservoir 11 of the bird feeder with an orifice appropriate for the size or type of seed to be dispensed, the bi-modal seed port features a hinged lid 25 that in one mode is designed to provide a lid or covering over the top of the trough 14 to deny access to any seeds flowing from the reservoir 11 into the trough, while simultaneously providing access to seeds remaining in the reservoir 11 through a small opening 23 in the lid 25. This opening in the lid is also aligned with the opening in the reservoir that allows seeds to pass into the trough 14 of the port 10.

FIG. 3 depicts the orientation of the hinged lid 25 in accordance with dispensing smaller seeds. An isolated depiction of the lid 25 in this mode is set forth in FIGS. 5 and 6. In this mode, a portion of the hinged lid 25 is in a horizontal plane to provide a covering or lid over the trough 14 while a second portion of the lid is in a vertical plane providing a small opening 23 for access to typically smaller seeds being stored in the reservoir 11.

In FIG. 7, the hinged lid 25 is depicted in the seed port's other mode. In this mode, the hinged lid 25 is rotated in order to remove the lid from the trough, thus providing access to seed in the trough, while eliminating access to seeds in the reservoir through the small opening in the lid. As depicted in FIG. 4, the once vertical portion 21 of the hinged lid with the small opening 23 for dispensing small seeds will, with removal of the once horizontal portion 22 of the lid covering the trough by rotation, be re-positioned within the reservoir 11 in a generally horizontal orientation.

Additionally, when the hinged lid 25 is in the large-seed dispensing mode, portion 21 functions as a baffle to modulate the amount of seed that can, or is likely to, flow into the trough. Clearly, the weight of the seed being supported by lid portion 21 when it is in the horizontal position will reduce the pressure or force on the seeds at the threshold of the trough and prevent the trough from overflowing.

FIG. 4 further clearly illustrates how the hinged lid 25 can be rotated on a pair of protruding journeys 24 within a pair of journey boxes 19 to provide either of two modes of access to seeds stored in the reservoir.

Another enhancement in the design of the hinged lid 25 is tab 26 which will provide a secure friction fit between the lid 25 and the trough 14 if the trough is to remain predictably closed; and an equally snug fit between the lid 25 and the periphery of the opening 16 in the platform 12 if the trough is to remain predictably open. Of course, the reverse is also true. When the trough is securely shut, the small seed opening 23 in the vertical portion of the lid is securely providing access to small seeds in the reservoir.

The seed port 10 has only one moving part and is thus easy to fabricate. It can be made from a variety of materials such as metals and thermoplastics; but, clearly molded plastics come first to mind as the preferred component for the construction. Other amenities, such as a hood 18, can be molded onto or attached to the platform 12 of the port to protect, to some extent, the seed in the trough from direct exposure to the various forms of moisture. As mentioned previously, the platform can include the molding or attachment of a perch 20, positioned to provide easy access to seeds available via either the trough 14 or the small opening 23 in the portion 21 of lid 25.

While the foregoing is a detailed and complete description of the preferred embodiment of the disclosed seed port, it should be apparent that numerous variations and modifications can be made and employed to implement the all-important purpose of the port without departing from the spirit of the invention, which is fairly defined by the appended claims.

What is claimed is:

1. A bi-modal seed port for a bird feeder, said feeder having a columnar reservoir for the containment of seeds, said reservoir having at least one opening in the side of said column to provide access to the contained seeds, and wherein said seed port comprises:

a vertical platform attachable to said reservoir and having an opening in alignment with an opening in the wall of said reservoir;

a trough on the anterior surface of said platform for collecting seeds flowing naturally through the aligned openings in the reservoir and the seed port platform; and a hinged lid attached to said trough and positioned to pivot thus providing alternative access to seeds in the trough or to seeds in the reservoir.

2. The seed port according to claim 1 further comprising a hood to shelter the contents of the trough.

3. The seed port according to claim 1 further comprising a perch to facilitate access to the seeds in the trough.

4. The seed port according to claim 1 wherein the hinged lid has a tab for forming a friction fit with the trough to securely close said trough while providing access to seed in the reservoir.

5. The tab according to claim 4 also positioned to engage and provide a friction fit with the periphery of the opening in the platform of the seed port to provide predictable access to seed in the trough.

* * * * *